US009403278B1

(12) United States Patent
Van Kampen et al.

(10) Patent No.: US 9,403,278 B1
(45) Date of Patent: Aug. 2, 2016

(54) SYSTEMS AND METHODS FOR DETECTING AND PICKING UP A WASTE RECEPTACLE

(71) Applicant: Waterloo Controls Inc., Conestogo (CA)

(72) Inventors: Leo Peter Van Kampen, Conestogo (CA); Justin Szoke-Sieswerda, London (CA); Brandon Castellano, Maple (CA); Kenneth Alexander McIsaac, St. Mary's (CA)

(73) Assignee: Waterloo Controls Inc., Conestogo, Ontario (CA)

( * ) Notice: Subject to any disclaimer, the term of this patent is extended or adjusted under 35 U.S.C. 154(b) by 6 days.

(21) Appl. No.: 14/662,791

(22) Filed: Mar. 19, 2015

(51) Int. Cl.
*G06K 9/00* (2006.01)
*B25J 9/16* (2006.01)
*B65F 3/04* (2006.01)
*G06T 7/00* (2006.01)

(52) U.S. Cl.
CPC ............. *B25J 9/1697* (2013.01); *B25J 9/1664* (2013.01); *B65F 3/04* (2013.01); *G06T 7/0044* (2013.01); *G06T 2207/10028* (2013.01); *G06T 2207/20024* (2013.01); *G06T 2207/20072* (2013.01)

(58) Field of Classification Search
USPC .......................................................... 382/103
See application file for complete search history.

(56) References Cited

U.S. PATENT DOCUMENTS

| | | | |
|---|---|---|---|
| 3,765,554 A | 10/1973 | Morrison | |
| 4,868,796 A * | 9/1989 | Ahrens | B65F 3/04 367/96 |
| 5,215,423 A * | 6/1993 | Schulte-Hinsken | B65F 3/00 414/408 |
| 5,539,292 A | 7/1996 | Vranish | |
| 5,762,461 A | 6/1998 | Fröhlingsdorf | |
| 5,851,100 A | 12/1998 | Brandt | |
| 6,123,497 A | 9/2000 | Duell et al. | |
| 6,152,673 A | 11/2000 | Anderson et al. | |
| 6,448,898 B1 | 9/2002 | Kasik | |
| 6,761,523 B2 | 7/2004 | Hund, Jr. et al. | |
| 7,018,155 B1 | 3/2006 | Heberling et al. | |
| 7,553,121 B2 | 6/2009 | Curotto et al. | |
| 7,831,352 B2 | 11/2010 | Laumer et al. | |
| 8,092,141 B2 | 1/2012 | Curotto et al. | |
| 8,615,108 B1 | 12/2013 | Stoppa et al. | |
| 2009/0297038 A1* | 12/2009 | Ishikawa | G06K 9/3275 382/209 |
| 2010/0206642 A1* | 8/2010 | Curotto | G06Q 10/30 177/1 |
| 2013/0322994 A1 | 12/2013 | Curotto et al. | |

FOREIGN PATENT DOCUMENTS

EP    1594770    5/2008

OTHER PUBLICATIONS

Hinterstoisser et al., Gradient Response Maps for Real-Time Detection of Texture-less Objects, IEEE Transactions on Pattern Analysis and Machine Intelligence, pp. 1-14.

* cited by examiner

*Primary Examiner* — Gregory F Cunningham
(74) *Attorney, Agent, or Firm* — Bereskin & Parr (57) ABSTRACT

Systems and methods for detecting and picking up a waste receptacle, the system being mountable on a waste-collection vehicle, and including an arm for grasping the waste receptacle, a processor, a camera, a non-transitory computer-readable medium, and an arm-actuation module. The processor is configured for generating a pose candidate based on an image captured by the camera, verifying that the pose candidate matches a template representation stored on the medium, and calculating a location of the waste receptacle. The arm-actuation module can be configured to automatically move the arm in response to the calculated location, in order to grasp the waste receptacle, lift, and dump the waste receptacle into a waste-collection vehicle.

20 Claims, 8 Drawing Sheets

SYSTEMS AND METHODS FOR DETECTING AND PICKING UP A WASTE RECEPTACLE

TECHNICAL FIELD

The disclosure herein relates to waste-collection vehicles, and in particular, to systems and methods for detecting and picking up a waste receptacle.

BACKGROUND

Waste collection has become a service that people have come to rely on in their residences and in their places of work. Residential waste collection, conducted by a municipality, occurs on "garbage day", when residents place their waste receptacles at the curb for collection by a waste-collection vehicle. Waste collection in apartment and condominium buildings and commercial and industrial facilities occurs when a waste-collection vehicle collects waste from a dumpster.

Generally speaking, the process of waste collection comprises picking up a waste receptacle, moving it to the hopper or bin of a waste-collection vehicle, dumping the contents of the waste receptacle into the hopper or bin of the waste-collection vehicle, and then returning the waste receptacle to its original location.

The waste-collection process places demands on waste-collection operators, in order to achieve efficiencies in a competitive marketplace. These efficiencies can be found in terms of labor costs, waste-collection capacity, waste-collection speed, etc. Even minor savings in the time required to pick up a single waste receptacle can represent significant economic savings when realized over an entire waste-collection operation.

One area of interest with respect to improving collection speed (i.e. reducing waste-collection time) is the automation of waste-receptacle pick-up. Traditionally, a waste-collection vehicle would be operated by a team of at least two waste-collection personnel. One person would drive the waste-collection vehicle from one location to the next (e.g. from one house to the next), and then stop the vehicle while the other person (or persons) would walk to the location of the waste receptacle, manually pick up the waste receptacle, carry it to the waste-collection vehicle, dump the contents of the waste receptacle into the waste-collection vehicle, and then return the waste receptacle to the place from where it was first picked up.

This process has been improved by the addition of a controllable mechanical arm mounted to the waste-collection vehicle. The arm is moveable based on joystick operation of a human operator. As such, the waste-collection vehicle could be driven within close proximity of the waste receptacle, and the arm could be deployed through joystick control in order to grasp, lift, and dump the waste receptacle.

Further improvements on the arm system have included the automatic or computer-assisted recognition of a waste receptacle. U.S. Pat. No. 5,215,423 to Schulte-Hinsken discloses a camera system for determining the spatial position of five reflective marks that have been previously attached to a garbage can. Due to the properties and geometric pattern of the five reflected marks, the pattern of the reflected marks can be distinguished from the natural environment and therefore easily detected by the camera. However, Schulte-Hinsken fails to teach a solution for detecting an un-marked and textureless garbage can in a natural environment, which may contain highly textured elements, such as foliage.

U.S. Pat. No. 5,762,461 to Frohlingsdorf discloses an apparatus for picking up a trash receptacle comprising a pickup arm that includes sensors within the head of the arm. Frohlingsdorf discloses that an operator can use a joystick to direct an ultrasound transmitter/camera unit towards a container. In other words, the operator provides gross control of the arm using the joystick. When the arm has been moved by the operator into sufficiently-close proximity, a fine-positioning mode of the system is evoked, which uses the sensors to orient the head of the arm for a specific mechanical engagement with the container. Frohlingsdorf relies on specific guide elements attached to a container in order to provide a specific mechanical interface with the pickup arm. As such, Frohlingsdorf does not provide a means of identifying and locating various types of containers.

Accordingly, the problem of efficiently identifying and locating various types of containers within a natural environment remains unsolved.

There is therefore a need for systems and methods for detecting and picking up a waste receptacle that address the inefficiencies found in the state of the art.

SUMMARY

According to one aspect, there is provided a system for detecting and picking up a waste receptacle. The system comprises an arm for grasping the waste receptacle, a processor, a camera in communication with the processor for capturing an image, a database in communication with the processor for storing a template representation corresponding to the waste receptacle, and an arm-actuation module in communication with the processor and connected to the arm. Any of the arm, processor, camera, database, and arm-actuation module may be mountable on a waste-collection vehicle.

The processor is configured for generating a pose candidate based on the image, and verifying whether the pose candidate matches the template representation. The processor is further configured for calculating a location of the waste receptacle when a match between the pose candidate and the template representation has been verified.

The arm-actuation module is configured to automatically move the arm in response to the calculated location of the waste receptacle.

According to some embodiments, the processor may be configured so that the step of generating the pose candidate comprises filtering the image and generating a set of gradient-response maps (GRMs). According to some embodiments, filtering the image comprises converting the image to the frequency domain from the spatial domain in order to obtain a spectral component of the image, applying a high-pass Gaussian filter to the spectral component, and then taking the inverse transform to convert the filtered image back to the spatial domain for further processing.

According to some embodiments, the processor may be configured so that the step of generating the pose candidate comprises suppressing noise via polling the image at least twice.

According to some embodiments, the processor may be configured so that the step of generating the set of gradient-response maps comprises referencing at least one look-up table comprising linearized cosine-response values.

According to some embodiments, the processor may be configured so that the step of verifying whether the pose candidate matches the template representation comprises comparing a histogram of oriented gradients (HOG) of the template image with an HOG of the pose candidate. Then, if the difference between the HOG of the template representation and the HOG of the pose candidate is below a pre-defined threshold, then the processor determines that the pose candidate matches the template representation. If the difference between the HOG of the template representation and the HOG of the pose candidate are above the pre-defined threshold, then the processor determines that the pose candidate does not match the template representation.

According to some embodiments, the processor may be configured so that the step of calculating the location of the waste receptacle is based on pose metadata stored in the template representation.

According to another aspect, there is provided a method for detecting and picking up a waste receptacle. The method comprises capturing an image with a camera, generating a pose candidate based on the image, and verifying whether the pose candidate matches a template representation. Then, if (and only if) the pose candidate matches the template representation, the method calculates a location of the waste receptacle, and moves an arm in response to the calculated location of the waste receptacle.

According to some embodiments, the step of generating a pose candidate comprises filtering the image and generating a gradient-response map. In some embodiments, filtering the image comprises converting the image to the frequency domain in order to obtain a spectral component of the image, applying a high-pass Gaussian filter to the spectral component, and then taking the inverse transform to convert the filtered image back to the spatial domain for further processing.

According to some embodiments, the step of generating a pose candidate comprises suppressing noise via polling the image at least twice.

According to some embodiments, the step of generating the set of gradient-response maps comprises referencing at least one look-up table comprising linearized cosine-response values.

According to some embodiments, the step of verifying whether the pose candidate matches the template representation comprises comparing an HOG of the template representation with an HOG of the pose candidate. Then, if the difference between the HOG of the template representation and the HOG of the pose candidate is below a pre-defined threshold, then the method determines that the pose candidate matches the template representation. If the difference between the HOG of the template representation and the HOG of the pose candidate are above the pre-defined threshold, then the method determines that the pose candidate does not match the template representation.

According to some embodiments, calculating a location of the waste receptacle is based on pose metadata stored in the template representation.

According to some embodiments, moving the arm comprises grasping the waste receptacle with the arm, and dumping the waste receptacle into a waste-collection vehicle.

According to another aspect, there is provided a method for creating a representation of an object. The method comprises capturing a plurality of images of the object at a plurality of angles and depths, deriving gradient information corresponding to the boundary of the object based on the plurality of images, obtaining pose information corresponding to the plurality of angles and depths, deriving pose metadata based on the pose information, and composing a template representation corresponding to the object based on the gradient information and the pose metadata.

According to some embodiments, the template representations are stored in a database on a non-transitory computer-readable medium.

BRIEF DESCRIPTION OF THE DRAWINGS

Some embodiments of the present disclosure will now be described, by way of example only, with reference to the following drawings, in which.

DETAILED DESCRIPTION

Figure 1:
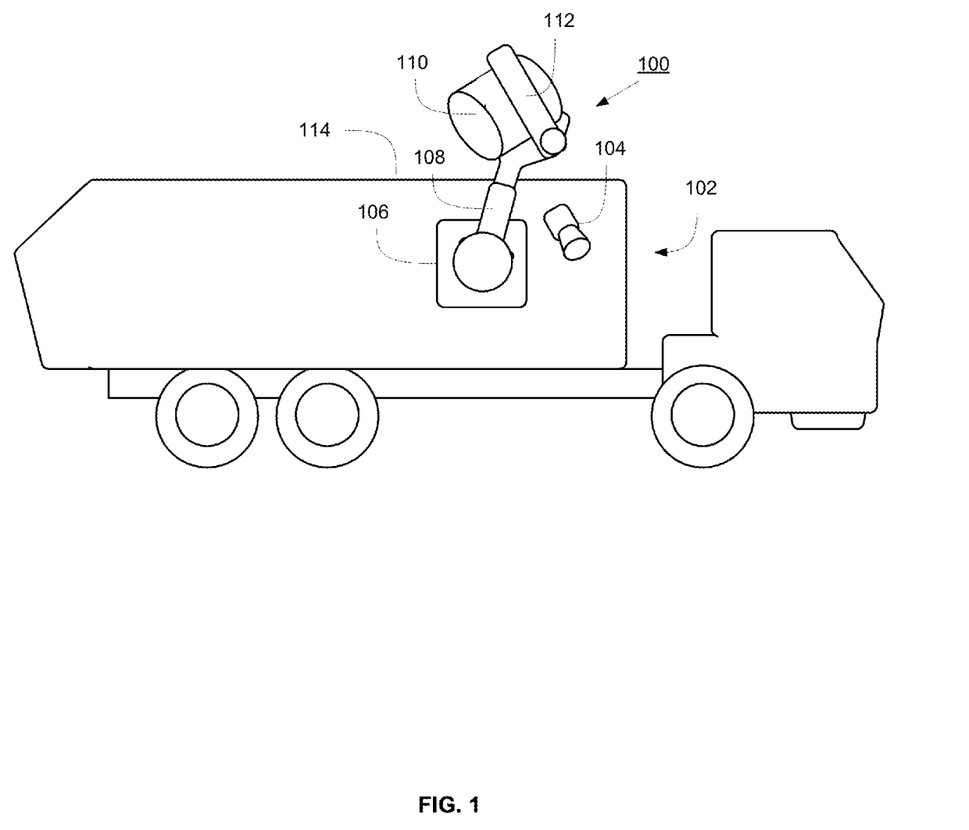
FIG. 1 is a schematic diagram of a system for detecting and picking up a waste receptacle, according to one embodiment.

Referring to FIG. 1, there is a system 100 for detecting and picking up a waste receptacle. The system 100 comprises a camera 104, an arm-actuation module 106, and an arm 108 for collecting the waste from a waste receptacle 110. According to some embodiments, the system 100 can be mounted on a waste-collection vehicle 102. When the camera 104 detects the waste receptacle 110, for example along a curb, arm-actuation module 106 moves the arm 108 so that the waste receptacle 110 can be dumped into the waste-collection vehicle 102.

A waste receptacle is a container for collecting or storing garbage, recycling, compost, and other refuse, so that the garbage, recycling, compost, or other refuse can be pooled with other waste, and transported for further processing. Generally speaking, waste may be classified as residential, commercial, industrial, etc. As used here, a "waste receptacle" may apply to any of these categories, as well as others. Depending on the category and usage, a waste receptacle may take the form of a garbage can, a dumpster, a recycling "blue box", a compost bin, etc. Further, waste receptacles may be used for curb-side collection (e.g. at certain residential locations), as well as collection in other specified locations (e.g. in the case of dumpster collection).

The camera 104 is positioned on the waste-collection vehicle 102 so that, as the waste-collection vehicle 102 is driven along a path, the camera 104 can capture real-time images adjacent to or in proximity of the path.

The arm 108 is used to grasp and move the waste receptacle 110. The particular arm that is used in any particular embodiment may be determined by such things as the type of waste receptacle, the location of the arm 108 on the waste-collection vehicle, etc.

The arm 108 is generally movable, and may comprise a combination of telescoping lengths, flexible joints, etc., such that the arm 108 can be moved anywhere within a three-dimensional volume that is within range of the arm 108.

According to some embodiments, the arm 108 may comprise a grasping mechanism 112 for grasping the waste receptacle 110. The grasping mechanism 112 may include any combination of mechanical forces (e.g. friction, compression, etc.) or magnetic forces in order to grasp the waste receptacle 110.

The grasping mechanism 112 may be designed for complementary engagement with a particular type of waste receptacle 110. For example, in order to pick up a cylindrical waste receptacle, such as a garbage can, the grasping mechanism 112 may comprise opposed fingers, or circular claws, etc., that can be brought together or cinched around the garbage can. In other cases, the grasping mechanism 112 may comprise arms or levers for complementary engagement with receiving slots on the waste receptacle.

Generally speaking, the grasping mechanism 112 may be designed to complement a specific waste receptacle, a specific type of waste receptacle, a general class of waste receptacles, etc.

The arm-actuation module 106 is generally used to mechanically control and move the arm 108, including the grasping mechanism 112. The arm-actuation module 106 may comprise actuators, pneumatics, etc., for moving the arm. The arm-actuation module 106 is electrically controlled by a control system for controlling the movement of the arm 108. The control system can provide control instructions to the arm-actuation module 106 based on the real-time images captured by the camera 104.

The arm-actuation module 106 controls the arm 108 in order to pick up the waste receptacle 110 and dump the waste receptacle 110 into the bin 114 of the waste-collection vehicle 102. In order to accomplish this, the control system that controls the arm-actuation module 106 verifies whether a pose candidate derived from an image captured by the camera 104 matches a template representation corresponding to a target waste receptacle.

However, in order to be able to verifying whether a pose candidate matches a template representation, the template representation must first be created. First, it is necessary to create template representations. Second, the template representations can be used to verify pose candidates based on real-time images. Pose candidates will be described in further detail below, after the creation of template representations is described.

Figure 2:
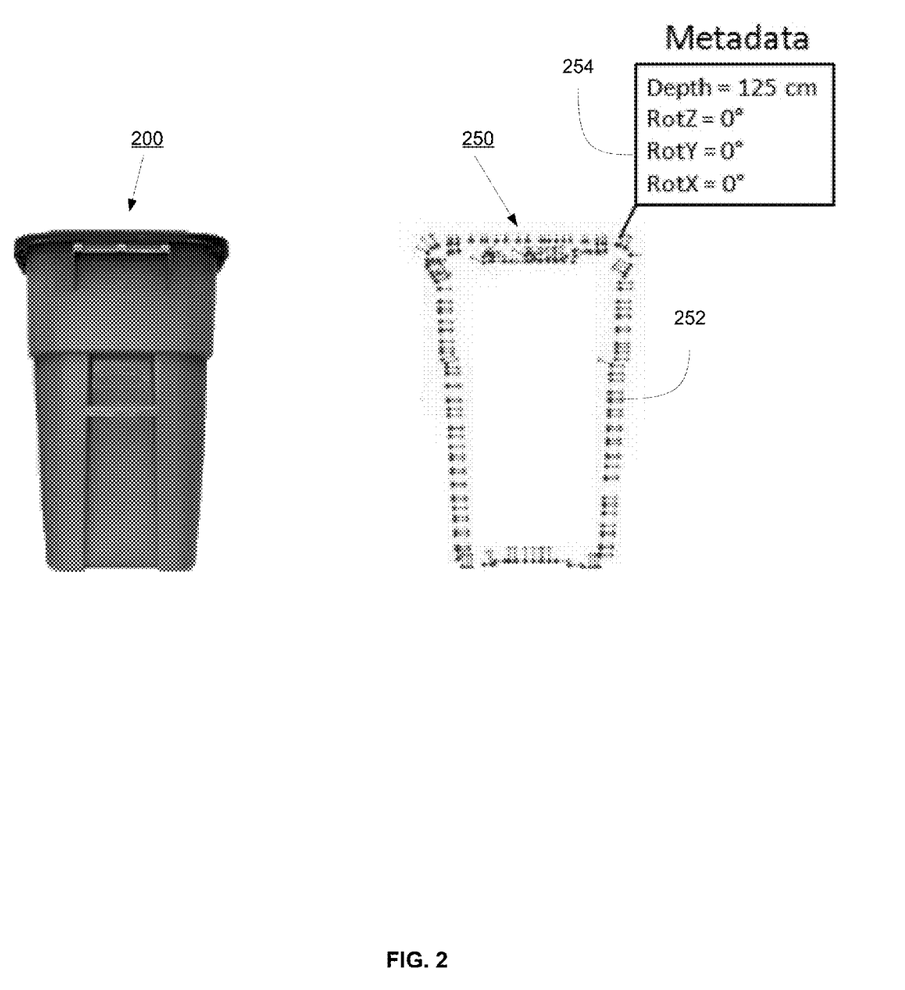
FIG. 2 is a pictorial representation of a waste receptacle and template representation associated with the waste receptacle.

Referring to FIG. 2, there is shown an example of a waste receptacle 200 and a template representation of a single pose 250 created in respect of the waste receptacle 200.

The template representation 250 is created by capturing multiple images of the object 200. These multiple images are captured by taking pictures at various angles and scales (depths) around the object 200. When a sufficient number of images have been captured for a particular object 200, the images are processed.

The final product of this processing is the template representation 250 associated with the object 200. In particular, the template representation 250 comprises gradient information data 252 and pose metadata 254. The complete object representation consists of a set of templates, one for each pose.

The gradient information 252 is obtained along the boundary of the object 200 as found in the multiple images. The pose metadata 254 are obtained from the pose information, such as the angles and scales (depths) at which each of the multiple images was captured. For example, the template representation 250 is shown for a depth of 125 cm, with no rotation about the X, Y, or Z axes.

Figure 3:
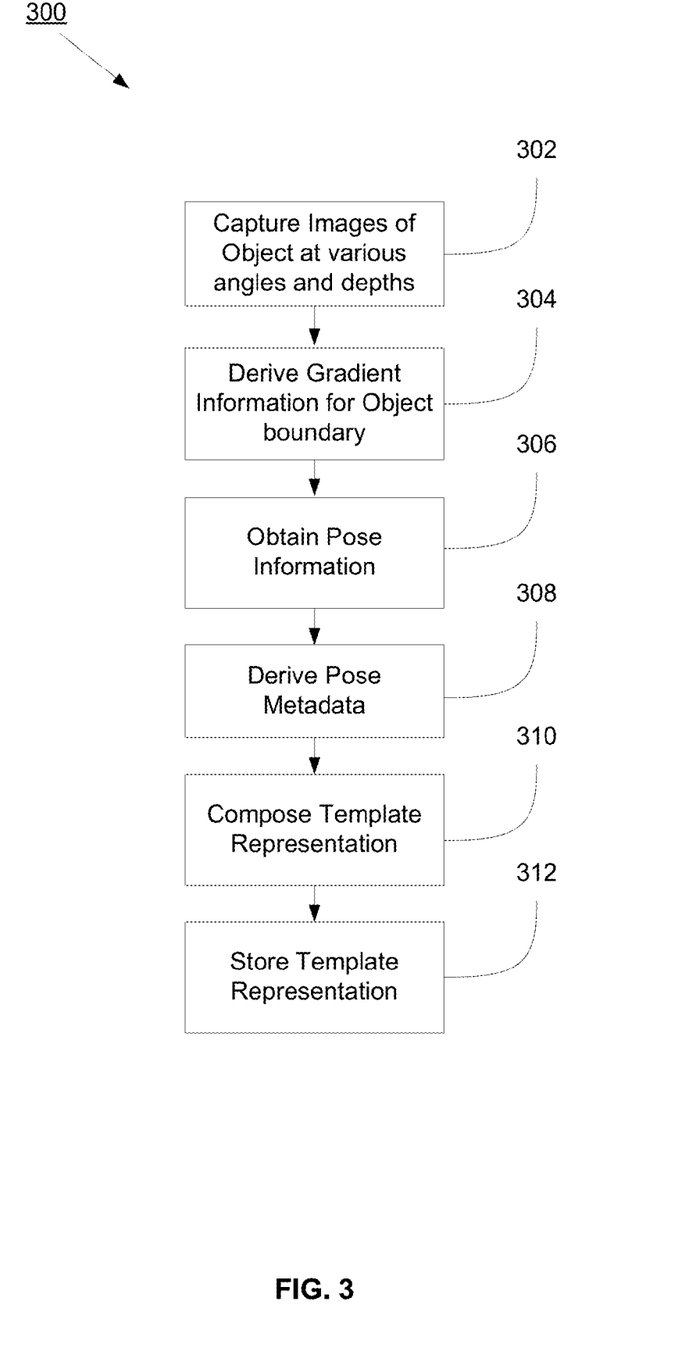
FIG. 3 is a flow diagram depicting a method for creating a representation of an object.

Referring to FIG. 3, there is shown a method 300 for creating a representation of an object.

The method begins at step 302, when images of an object are captured at various angles and scales (depths). The images are captured by taking pictures of an object, such as the waste receptacle 200, at various angles and scales (depths). Each image is associated with pose information, such as the depth, and the three-dimensional position and/or rotation of the camera in respect of a reference point or origin.

At step 304, gradient information is derived for the object boundary for each image captured. For example, as seen in FIG. 2, the gradient information is represented by the gradient information data 252. As can be seen, the gradient field comprising the gradient information data 252 corresponds to the boundaries (edges) of the waste receptacle 200.

At step 306, pose information associated with each image is obtained. For example, this may be derived from the position of the camera relative to the object, which can be done automatically or manually, depending on the specific camera and system used to capture the images.

At step 308, pose metadata are derived based on the pose information associated with each image. The pose metadata are derived according to a prescribed or pre-defined format or structure such that the metadata can be readily used for subsequent operations such as verifying whether a pose candidate matches a template representation.

At step 310, a template representation is composed using the gradient information and pose metadata that were previously derived. As such, a template representation comprises gradient information and associated pose metadata corresponding to each image captured.

At step 312, the template representation is stored so that it can be accessed or transferred for future use. Once the template representations have been created and stored, they can be used to verify pose candidates derived from real-time images, as will be described in further detail below. According to some embodiments, the template representations may be stored in a database. According to some embodiments, the template representations (including those in a database) may be stored on a non-transitory computer-readable medium. For example, the template representations may be stored in database 418, as shown in FIG. 4, and further described below.

Figure 4:
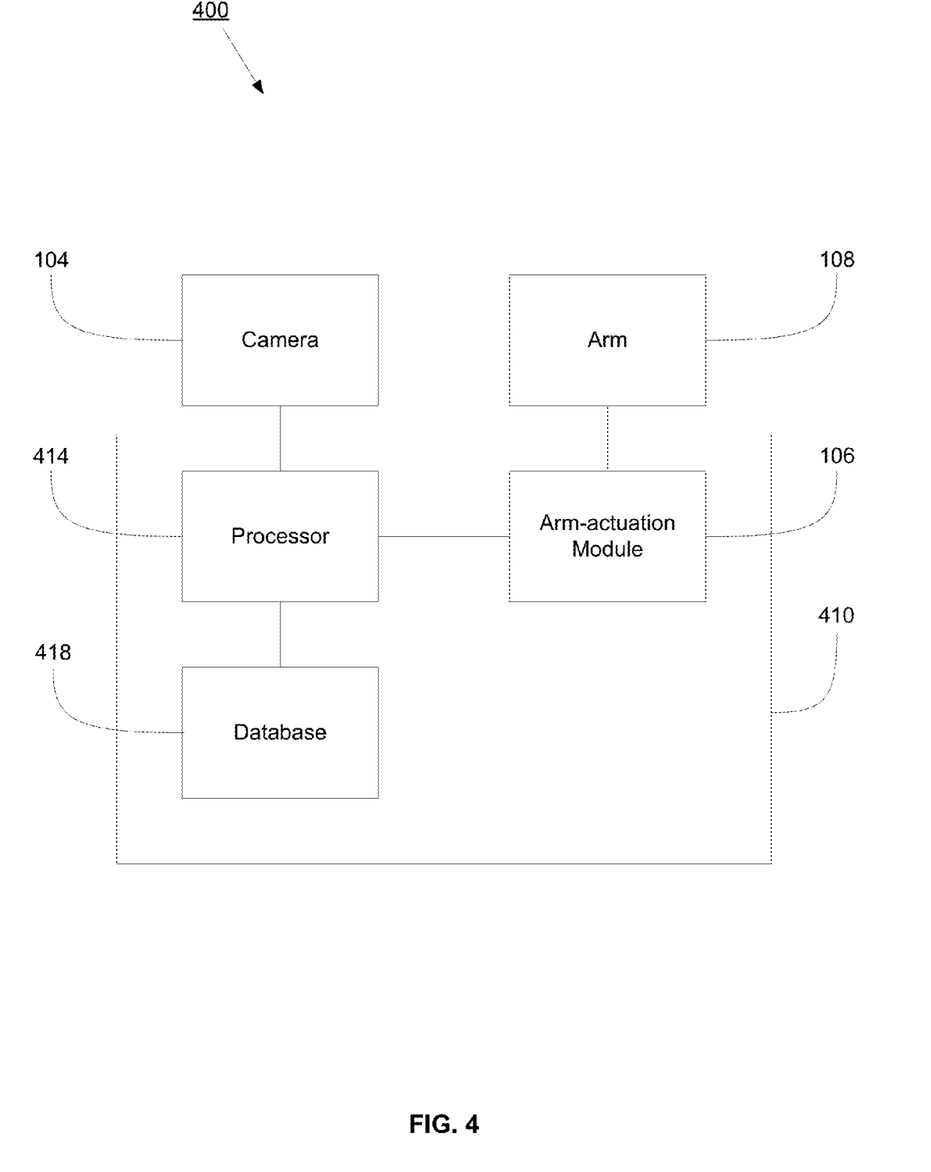
FIG. 4 is a network diagram showing a system for detecting and picking up a waste receptacle.

Referring to FIG. 4, there is shown a system 400 for detecting and picking up a waste receptacle. The system comprises a control system 410, a camera 104, and an arm 108. The control system 410 comprises a processor 414, a database 418, and an arm-actuation module 106. According to some embodiments, the system 400 can be mounted on or integrated with a waste-collection vehicle, such as waste-collection vehicle 102.

In use, the camera 104 captures real-time images adjacent to the waste-collection vehicle as the waste-collection vehicles is driven along a path. For example, the path may be a residential street with garbage cans placed along the curb. The real-time images from the camera 104 are communicated to the processor 414. The real-time images from the camera 104 may be communicated to the processor 414 using additional components such as memory, buffers, data buses, transceivers, etc., which are not shown.

The processor 414 is configured to recognize a waste receptacle, based on an image that it receives from the camera 104 and a template representation stored in the database 418.

Figure 5:
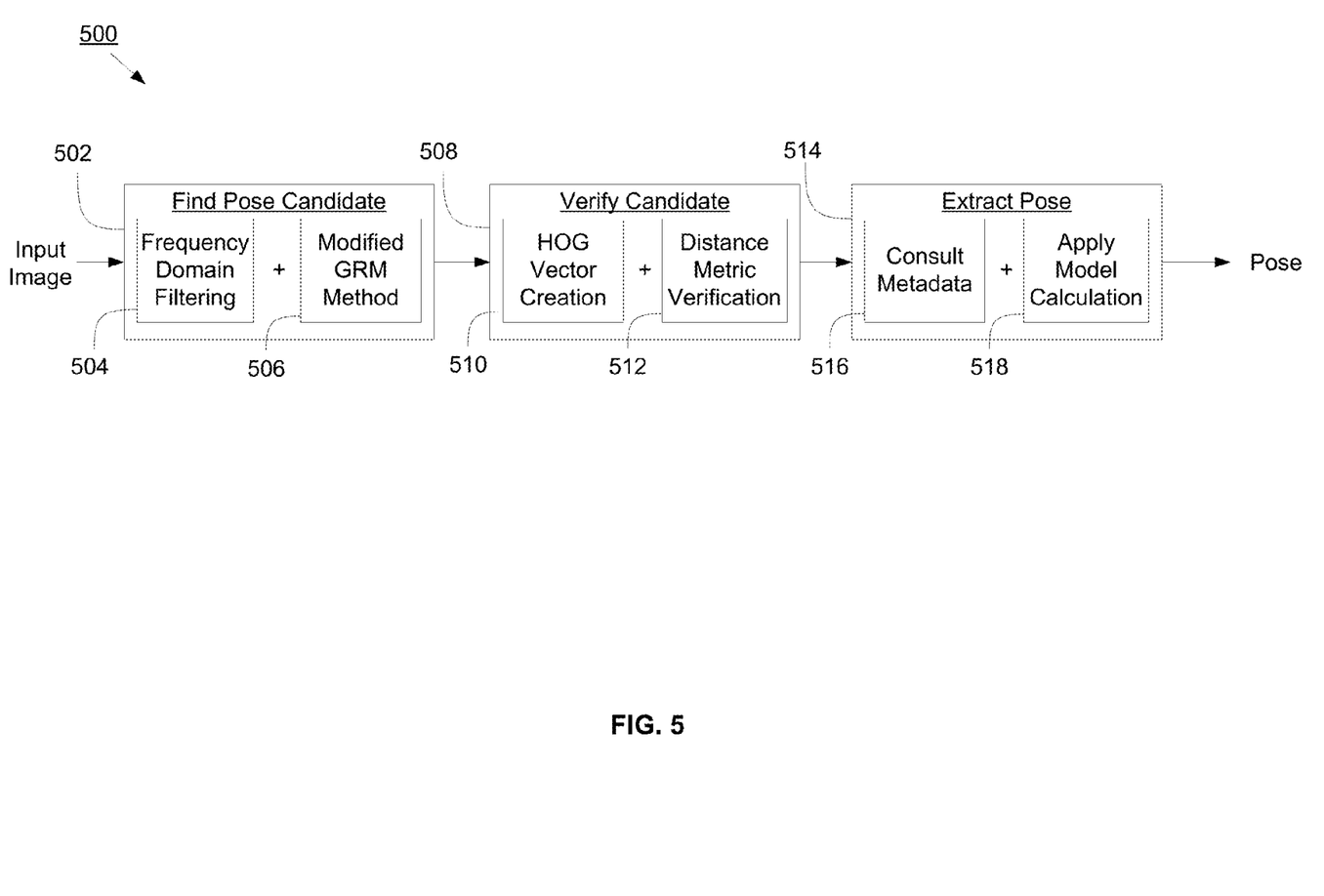
FIG. 5 is a flow diagram depicting a method pipeline used to detect and locate a waste receptacle.

Referring to FIG. 5, a general method 500 for detecting and locating a waste receptacle is shown, such as can be performed by the processor 414. The method 500 can be described as including the steps of generating a pose candidate 502, verifying the pose candidate 508, and calculating the location of the recognized waste receptacle 514 (i.e. extracting the pose).

The generate a pose candidate step 502 can be described in terms of frequency domain filtering 504 and a gradient-response map method 506. The step of verifying the pose candidate 508 can be described in terms of creating a histogram of oriented gradients (HOG) vector 510 and a distance-metric verification 512. The extract pose step 514 (in which the location of the recognized waste receptacle is calculated) can be described in terms of consulting the pose metadata 516, and applying a model calculation 518. The step of consulting the pose metadata 516 generally requires retrieving the pose metadata from the database 418.

Figure 6:
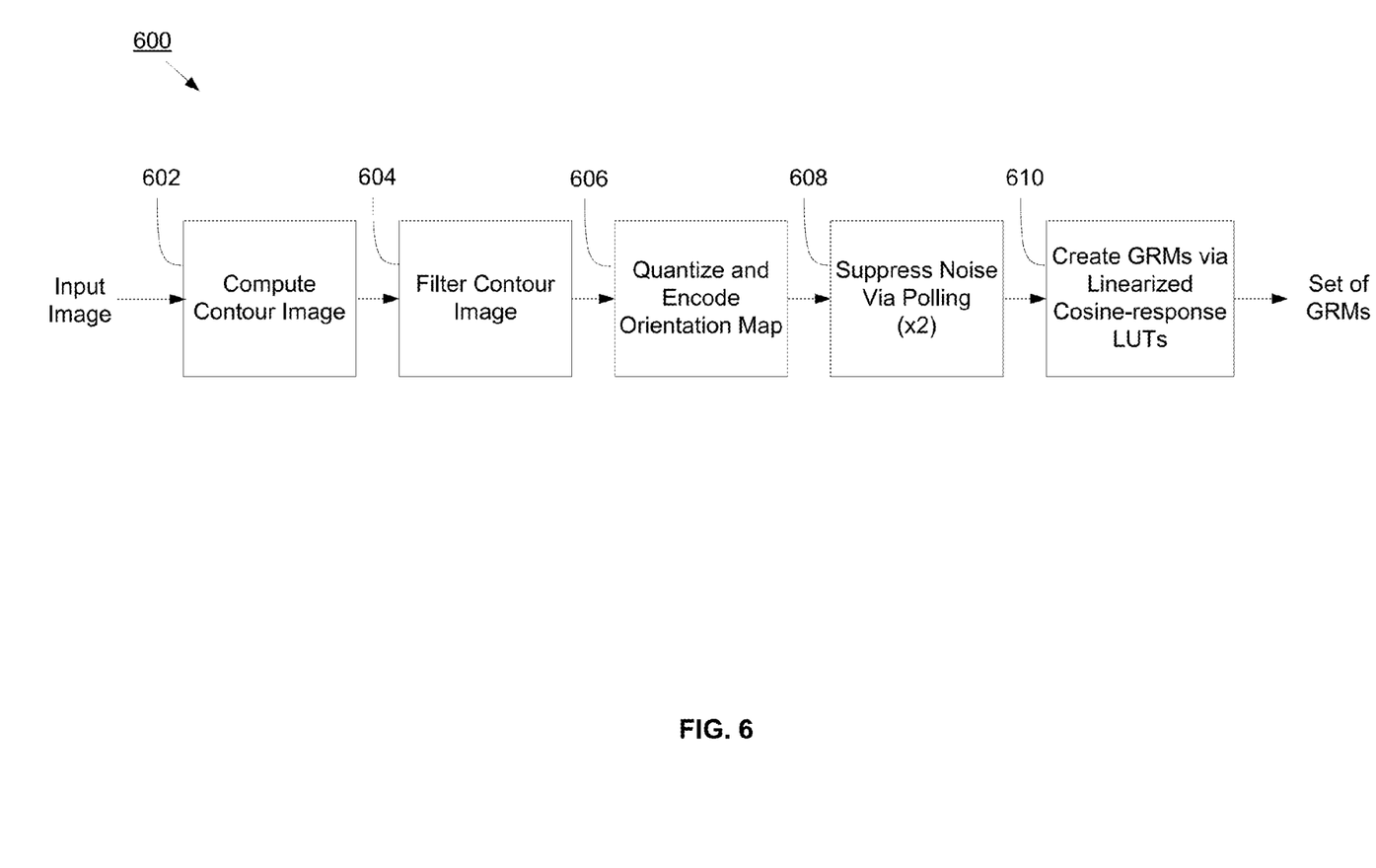
FIG. 6 is a flow diagram depicting an example of a modified Line2D gradient-response map method.

Referring to FIG. 6, there is shown a modified Line2D method 600 for implementing the generating pose candidate step 502. A Line2D method can be performed by the processor 414, and the instructions for a Line2D method may generally be stored in system memory (not shown).

A standard Line2D method can be considered to comprise a compute contour image step 602, a quantize and encode orientation map step 606, a suppress noise via polling step 608, and a create gradient-response maps (GRMs) via look-up tables (LUTs) step 610. In the method 600 as depicted, a filter contour image step 604 has been added as compared to the standard Line2D method. Furthermore, the suppress noise via polling step 608 and the create GRMs via LUTs step 610 have been modified as compared to the standard Line2D method.

The filter contour image step 604 converts the image to the frequency domain from the spatial domain, applies a high-pass Gaussian filter to the spectral component, and then converts the processed image back to the spatial domain. The filter contour image component 604 can reduce the presence of background textures in the image, such as grass and foliage.

The suppression of noise via polling step 608 is modified from a standard Line2D method by adding a second iteration of the process to the pipeline. In other words, polling can be performed twice instead of once, which can help reduce false positives in some circumstances.

The create GRMs via LUTs step 610 is modified from a standard Line2D method by redefining the values used in the LUTs. Whereas a standard Line2D method may use values that follow a cosine response, the values used in the LUTs in the modified component 610 follow a linear response.

Figure 7:
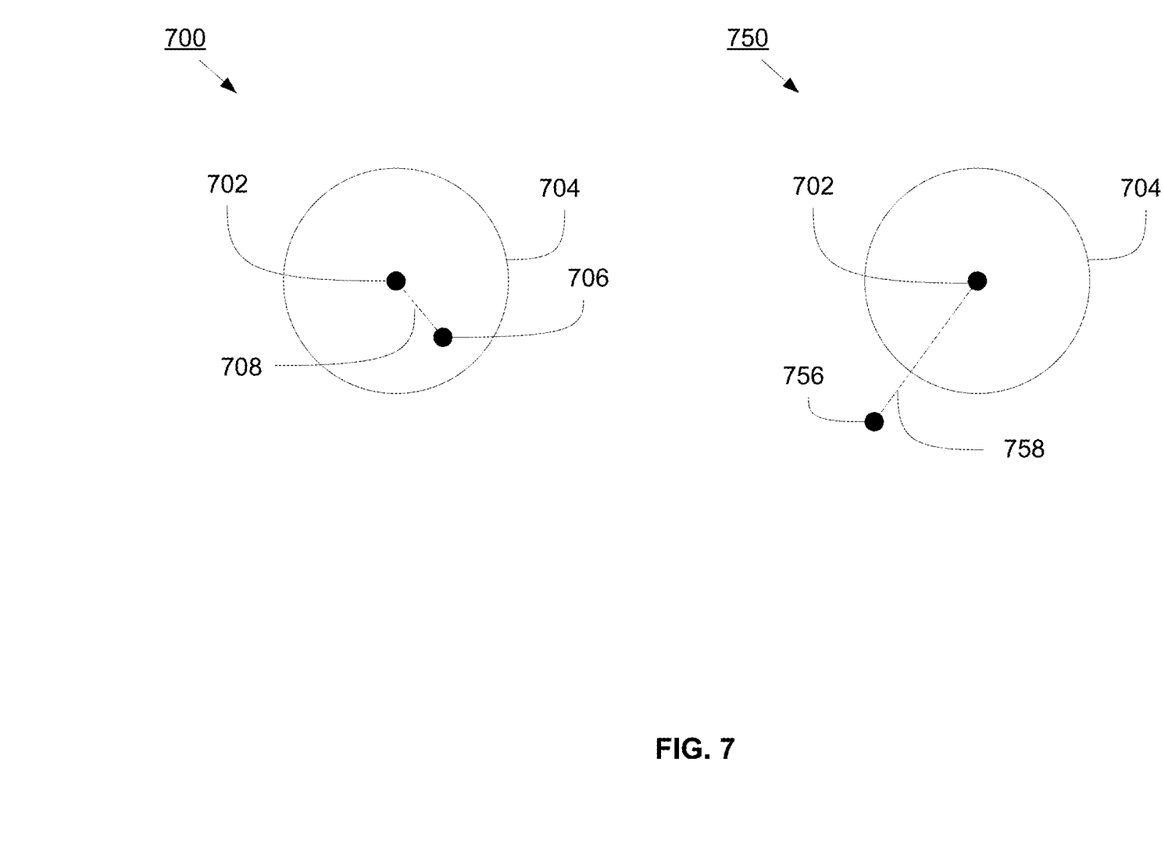
FIG. 7 is a pictorial representation of the verify candidate step of a method for detecting and locating a waste receptacle; and, FIG. 8 is a flow diagram depicting a method for detecting and picking up a waste receptacle.

Referring to FIG. 7, there is shown a pictorial representation of the verify candidate step 508. Two examples are shown in FIG. 7. The first example 700 depicts a scenario in which a match is found between the HOG of the template representation and the HOG of the pose candidate. The second example 750 depicts a scenario in which a match is not found.

In each example 700 and 750, the HOG of a template representation 702 is depicted at the center of a circle that represents a pre-defined threshold 704.

Example 700 depicts a scenario in which the HOG of a pose candidate 706 is within the circle. In other words, the difference 708 (shown as a dashed line) between the HOG of the template representation 702 and the HOG of the pose candidate 706 is less than the pre-defined threshold 704. In this case, a match between the pose candidate and the template representation can be verified.

Example 750 depicts a scenario in which the HOG of a pose candidate 756 is outside the circle. In other words, the difference 758 between the HOG of the template representation 702 and the HOG of the pose candidate 756 is more than the pre-defined threshold 704. In this case, a match between the pose candidate and the template representation cannot be verified.

Referring again to FIG. 5, when a match between the pose candidate and the template representation has been verified at step 508, the method 500 proceeds to the extract pose step 514. This step exploits the pose metadata stored during the creation of the template representation of the waste receptacle. This step calculates the location of the waste receptacle (e.g. the angle and scale). The location of the waste receptacle can be calculated using the pose metadata, the intrinsic parameters of the camera (e.g. focal length, feature depth, etc.), and a pin-hole model.

Referring again to FIG. 4, once the location of the waste receptacle has been calculated, the arm-actuation module 106 can be used to move the arm 108 according to the calculated location of the waste receptacle. According to some embodiments, the processor 414 may be used to provide control instructions to the arm-actuation module 106. According to other embodiments, the control signals may be provided by another processor (not shown), including a processor that is integrated with arm-actuation module 106.

Figure 8:
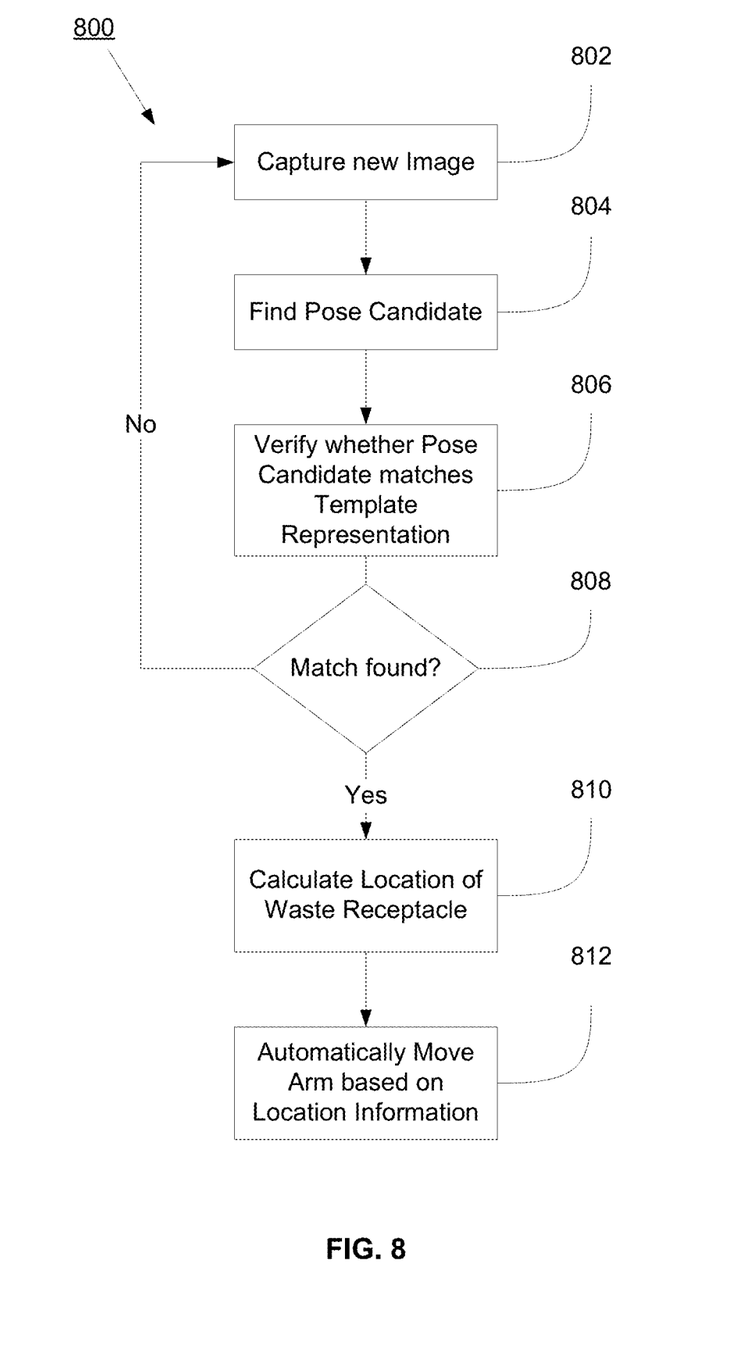

Referring to FIG. 8, there is shown a method for detecting and picking up a waste receptacle. The method begins at 802, when a new image is captured. For example, the new image may be captured by the camera 104, mounted on a waste-collection vehicle as it is driven along a path. According to some embodiments, the camera 104 may be a video camera, capturing real-time images at a particular frame rate.

At 804, the method finds a pose candidate based on the image. For example, the method may identify a waste receptacle in the image.

According to some embodiments, step 804 may include the steps of filtering the image and generating a set of gradient-response maps. For example, filtering the image may be accomplished by converting the image to the frequency domain, obtaining a spectral component of the image, applying a high-pass Gaussian filter to the spectral component, and then returning the image back to its spatial representation.

According to some embodiments, step 804 may include a noise suppression step. For example, noise can be suppressed via polling, and, in particular, superior noise-suppression results can be obtained by performing the polling twice (instead of once).

At 806, the method verifies whether the pose candidate matches the template representation. According to some embodiments, this is accomplished by comparing an HOG of the template representation with an HOG of the pose candidate. The difference between the HOG of the template representation and the HOG of the pose candidate can be compared to a pre-defined threshold such that, if the difference is below the threshold, then the method determines that a match has been found; and if the difference is above the threshold, then the method determines that a match has not been found.

At 808, the method queries whether a match between the pose candidate and the template representation during the previous step at 806. If a match is not found—i.e. if the waste receptacle (or other target object) was not found in the image—then the method returns to step 802, such that a new image is captured, and the method proceeds with the new image. If, on the other hand, a match is found, then the method proceeds to step 810.

At step 810, the location of the waste receptacle is calculated. According to some embodiments, the location can be determined based on the pose metadata stored in the matched template representation. For example, once a match has been determined at step 808, then, effectively, the waste receptacle (or other target object) has been found. Then, by querying the pose metadata associated with the matched template representation, the particular pose (e.g. the angle and scale or depth) can be determined.

At step 812, the arm 108 is automatically moved based on the location information. The arm may be moved via the arm-actuation module 106.

According to some embodiments, the arm 108 may be moved entirely automatically. In other words, the control system 410 may control the precise movements of the arm 108 necessary for the arm 108 to grasp the waste receptacle, lift the waste receptacle, dump the waste receptacle into the waste-collection vehicle, and then return the waste receptacle to its original position, without the need for human intervention.

According to other embodiments, the arm 108 may be moved automatically towards the waste receptacle, but without the precision necessary to move the waste receptacle entirely without human intervention. In such a case, the control system 410 may automatically move the arm 108 into sufficient proximity of the waste receptacle such that a human user is only required to control the arm 108 over a relatively short distance in order to grasp the waste receptacle. In other words, according to some embodiments, the control system 410 may move the arm 108 most of the way towards a waste receptacle by providing gross motor controls, and a human user (for example, using a joystick control), may only be required to provide fine motor controls.

While the above description provides examples of one or more apparatus, methods, or systems, it will be appreciated that other apparatus, methods, or systems may be within the scope of the claims as interpreted by one of skill in the art.

The invention claimed is:

1. A system for detecting and picking up a waste receptacle, comprising:
   a) an arm for grasping the waste receptacle, the arm mountable on a waste-collection vehicle;
   b) a camera for capturing an image;
   c) a database for storing a template representation corresponding to the waste receptacle;
   d) an arm-actuation module connected to the arm; and
   e) a processor mounted on the waste-collection vehicle, in communication with the camera and the database and the arm-actuation module;
   f) wherein the processor is configured for:
      i) generating a pose candidate based on the image;
      ii) verifying whether the pose candidate matches the template representation; and
      iii) if the pose candidate matches the template representation, calculating a location of the waste receptacle; and
   g) wherein the arm-actuation module is configured for automatically moving the arm in response to the calculated location of the waste receptacle.

2. The system of claim 1, wherein the processor is configured so that the step of generating the pose candidate comprises filtering the image and generating a set of gradient-response maps.

3. The system of claim 2, wherein the filtering the image comprises:
   a) converting the image to a frequency domain from a spatial domain in order to obtain a spectral component of the image;
   b) applying a high-pass Gaussian filter to the spectral component; and,
   c) converting the image back to the spatial domain after filtering.

4. The system of claim 2, wherein the processor is configured so that the step of generating the pose candidate further comprises suppressing noise via polling, the polling being performed at least twice.

5. The system of claim 2, wherein the processor is configured so that the step of generating the set of gradient-response maps comprises referencing at least one look-up table comprising linearized cosine-response values.

6. The system of claim 1, wherein the processor is configured so that the step of verifying whether the pose candidate matches the template representation comprises:
   a) comparing a histogram of orientated gradients (HOG) of the template image with an HOG of the pose candidate;
   b) determining that the pose candidate matches the template representation if the difference between the HOG of the template representation and the HOG of the pose candidate is below a pre-defined threshold; and,
   c) determining that the pose candidate does not match the template representation if the difference between the HOG of the template representation and the HOG of the pose candidate is above the pre-defined threshold.

7. The system of claim 1, wherein the processor is configured so that the step of calculating the location of the waste receptacle is based on pose metadata stored in the template representation.

8. The system of claim 1, wherein the arm-actuation module is configured so that the moving the arm comprises grasping the waste receptacle.

9. The system of claim 8, wherein the moving the arm further comprises lifting the waste receptacle and dumping contents of the waste receptacle into the waste-collection vehicle.

10. The system of claim 9, further comprising the waste-collection vehicle.

11. A method for detecting and picking up a waste receptacle comprising:
   a) capturing an image with a camera;
   b) generating a pose candidate based on the image;
   c) verifying whether the pose candidate matches a template representation;
   d) if and only if the pose candidate matches the template representation, calculating a location of the waste receptacle; and,
   e) moving an arm mounted on a waste-collection vehicle in response to the calculated location of the waste receptacle.

12. The method of claim 11, wherein the generating a pose candidate comprises filtering the image and generating a set of gradient-response maps.

13. The method of claim 12, wherein the filtering the image comprises:
   a) converting the image to a frequency domain from a spatial domain in order to obtain a spectral component of the image;
   b) applying a high-pass Gaussian filter to the spectral component; and,
   c) converting the image back to the spatial domain after filtering.

14. The method of claim 12, wherein the generating the pose candidate further comprises suppressing noise via polling, the polling being performed at least twice.

15. The method of claim 12, wherein the step of generating the set of gradient-response maps comprises referencing at least one look-up table comprising linearized cosine-response values.

16. The method of claim 12, wherein the verifying whether the pose candidate matches the template representation comprises:
   a) comparing a histogram of oriented gradients (HOG) of the template representation with an HOG of the pose candidate;
   b) determining that the pose candidate matches the template representation if the difference between the HOG of the template representation and the HOG of the pose candidate is below a pre-defined threshold; and, c) determining that the pose candidate does not match the template representation if the difference between the HOG of the template representation and the HOG of the pose candidate is above the pre-defined threshold.

17. The method of claim 12, wherein the calculating a location of the waste receptacle is based on pose metadata stored in the template representation.

18. The method of claim 12, wherein the moving the arm comprises grasping the waste receptacle.

19. A method for creating a representation of an object, comprising:

a) capturing a plurality of images of the object at a plurality of angles and depths;

b) deriving gradient information corresponding to the boundary of the object based on the plurality of images;

c) obtaining pose information corresponding to the plurality of angles and depths;

d) deriving pose metadata based on the pose information; and, e) composing a template representation corresponding to the object based on the gradient information and the pose metadata.

20. The method of claim 19, further comprising storing the template representation in a database.

* * * * *